(12) United States Patent
Guo et al.

(10) Patent No.: US 11,786,827 B2
(45) Date of Patent: Oct. 17, 2023

(54) MAP SWITCHING METHOD AND APPARATUS, STORAGE MEDIUM, AND DEVICE

(71) Applicant: Tencent Technology (Shenzhen) Company Limited, Shenzhen (CN)

(72) Inventors: Haiyuan Guo, Shenzhen (CN); Yan Xia, Shenzhen (CN); Wei Sun, Shenzhen (CN); Lei Zheng, Shenzhen (CN); Jing Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 300 days.

(21) Appl. No.: 17/365,921

(22) Filed: Jul. 1, 2021

(65) Prior Publication Data
US 2021/0331079 A1 Oct. 28, 2021

Related U.S. Application Data

(63) Continuation of application No. PCT/CN2020/081271, filed on Mar. 26, 2020.

(30) Foreign Application Priority Data

Apr. 26, 2019 (CN) .......................... 201910346254.1

(51) Int. Cl.
*A63F 13/803* (2014.01)
*A63F 13/5378* (2014.01)
*G06F 3/0482* (2013.01)

(52) U.S. Cl.
CPC ........ *A63F 13/803* (2014.09); *A63F 13/5378* (2014.09); *G06F 3/0482* (2013.01)

(58) Field of Classification Search
CPC ... A63F 13/803; A63F 13/5378; G06F 3/0482
See application file for complete search history.

(56) References Cited

U.S. PATENT DOCUMENTS

| | | |
|---|---|---|
| 7,264,547 B1 | 9/2007 | Norimatsu |
| 2006/0135236 A1 | 6/2006 | Sato et al. |

(Continued)

FOREIGN PATENT DOCUMENTS

| | | |
|---|---|---|
| CN | 102646152 A | 8/2012 |
| CN | 102760205 A | 10/2012 |

(Continued)

OTHER PUBLICATIONS

Fastest Kart + BIKE in Mario Kart 8 Deluxe !! Win Every Time Using this Combination!, EYstreem, May 20, 2017, available online at https://www.youtube.com/watch?v=aZWcow-g8f8 (Year: 2017).*

(Continued)

*Primary Examiner* — James S. McClellan
(74) *Attorney, Agent, or Firm* — Morgan, Lewis & Bockius LLP

(57) ABSTRACT

This application discloses a map switching method in a virtual game environment performed at a computer device. The method includes: launching a process corresponding to a round of racing game for a client at the computer device, the round of racing game having a plurality of virtual maps that are spliced together and including a first virtual map and a second virtual map that is connected to the first virtual map through a first teleporter; obtaining a travel position of a first virtual racing car in a first virtual map, the first virtual racing car being controlled by a first account logged into the client; and teleporting the first virtual racing car from the first virtual map to the second virtual map in the round of racing game when the travel position reaches the first teleporter in the first virtual map.

20 Claims, 8 Drawing Sheets

(56) References Cited

U.S. PATENT DOCUMENTS

2009/0005139 A1  1/2009  Morimoto
2011/0256912 A1* 10/2011 Baynes ................ A63F 13/803
                                                              463/43

FOREIGN PATENT DOCUMENTS

| CN | 108635852 A | 10/2018 |
| CN | 110013670 A | 7/2019 |
| EP | 1661608 A1 | 5/2006 |
| JP | 2004105671 A | 4/2004 |
| JP | 2008200538 A | 9/2008 |

OTHER PUBLICATIONS

Tencent Technology, SG Office Action, Singapore Patent Application No. 11202105257S, dated Sep. 19, 2022, 12 pgs.
"All of the New Series!", Ipod model change, MacPeople, Japan, ASCII Media Works Co., Ltd., Jan. 29, 2010, vol. 16, No. 11, 4 pgs.
"Complete Strategies of a Game", Baub Advance R., 18th Edition, Futabasha Co., Ltd., Jan. 5, 2007, 7 pgs.
"Project Gotham Lacing 3", Fagi Passage, Xbox 360, Appellee, vol. 4, Nov. 1, 2005, 5 pgs.
Tencent Technology, JP Office Action, JP Patent Application No. 2021-528426, dated Jun. 13, 2022, 12 pgs.
Nan Dui Ah Nei, "Preview of the Portal Lobby of the New Main City, a Room Connecting the Whole World", Sina World of Warcraft, Jan. 17, 2019, Retrieved from the Internet: http://games.sina.com.cn/o/z/wow/2019-01-17/hqfskcn8028665.shtml.
"QQ Speed Mobile Game Forwards, In and Out Freely, This Is Not an Arbitrary Door", Sep. 3, 2018, Retrieved from the Internet: http://news.17173.com/z/qqfcsy/content/09032018/161650931.shtml.
Tencent Technology, ISR, PCT/CN2020/081271, Jun. 29, 2020, 3 pgs.
"Warcraft 8.1.5 New Main City Portal Hall, One Room Connects The Whole World!", Jan. 9, 2019, Retrieved from the Internet: https://www.bilibili.com/video/av40321600/?spm_id_from=trigger_reload.
Luo Yu, "QQ Speed Mobile Games Super Speed Race—How to Play Super Speed Race Game Guide", Jun. 20, 2018, Retrieved from the Internet: http://news.4399.com/qqfc/xinde/m/849993.html.
Pew, "Everyone Together Bung Bung Bung: The Trending Racing Game These Days?!", Dec. 11, 2013, 3 pgs., Retrieved from the Internet: https://www.youtube.com/watch?v=dZE5uBOLi50.
Tencent Technology, KR Office Action, Korean Patent Application No. 10-2021-7022926, dated Sep. 19, 2022, 12 pgs.
Tencent Technology, WO, PCT/CN2020/081271, Jun. 29, 2020, 5 pgs.
Tencent Technology, IPRP, PCT/CN2020/081271, Sep. 28, 2021, 6 pgs.
Tencent Technology, Indonesian Office Action, ID Patent Application No. P00202105551, dated Jun. 19, 2023, 2 pgs.

* cited by examiner

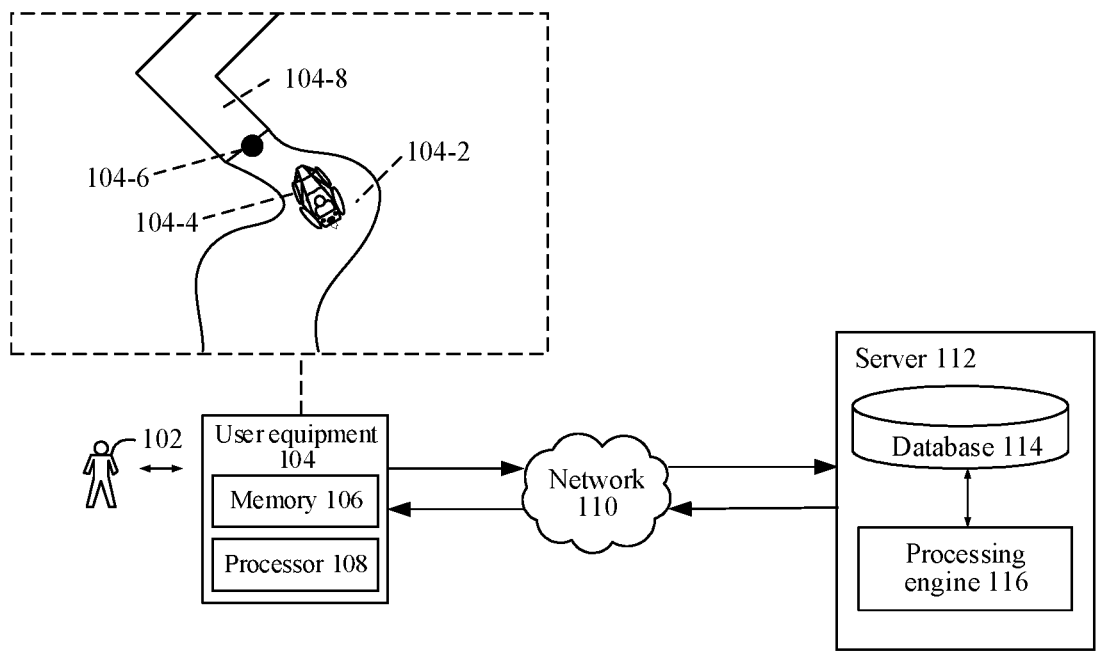

FIG. 1

Obtain a travel position of a first virtual racing car in a first virtual map in a process that a client runs a round of racing game, the first virtual racing car being controlled by a first account logged in to the client, and the first virtual map being a virtual map in the round of racing game    S202

Teleport the first virtual racing car from the first virtual map to a second virtual map in the round of racing game in a case that the travel position reaches a first teleporter in the first virtual map, the first virtual map being connected to the second virtual map through the first teleporter, a virtual map used in the round of racing game being spliced by a plurality of virtual maps, and the plurality of virtual maps including the first virtual map and the second virtual map    S204

FIG. 2

MAP SWITCHING METHOD AND APPARATUS, STORAGE MEDIUM, AND DEVICE

CROSS-REFERENCE TO RELATED APPLICATIONS

This application is a continuation application of PCT Patent Application No. PCT/CN2020/081271, entitled "MAP SWITCHING METHOD AND APPARATUS, AND STORAGE MEDIUM AND DEVICE" filed on Mar. 26, 2020, which claims priority to Chinese Patent Application No. 201910346254.1, filed with the State Intellectual Property Office of the People's Republic of China on Apr. 26, 2019, and entitled "MAP SWITCHING METHOD AND APPARATUS, STORAGE MEDIUM, AND ELECTRONIC APPARATUS IN GAME APPLICATION", all of which are incorporated herein by reference in their entirety.

FIELD OF THE TECHNOLOGY

This application relates to the field of computers, and specifically, to a map switching technology.

BACKGROUND OF THE DISCLOSURE

In the related art, in a process that a client runs a racing game, a homeowner generally selects one map as a map used for racing before a round of racing game starts.

SUMMARY

Embodiments of this application provide a map switching method and apparatus, a storage medium, and a device, to implement an effect of crossing over a plurality of virtual maps in a round of racing game and improve map richness in the racing game.

According to an aspect of the embodiments of this application, a map switching method is provided, including:
  launching a process corresponding to a round of racing game for a client at the computer device, the round of racing game having a plurality of virtual maps that are spliced together and including a first virtual map and a second virtual map that is connected to the first virtual map through a first teleporter;
  obtaining a travel position of a first virtual racing car in a first virtual map, the first virtual racing car being controlled by a first account logged into the client; and
  teleporting the first virtual racing car from the first virtual map to the second virtual map in the round of racing game when the travel position reaches the first teleporter in the first virtual map.

In one example, the method further includes: switching a virtual racing car controlled by the first account in the second virtual map from the first virtual racing car to a second virtual racing car when the second virtual map is a target virtual map; and controlling the second virtual racing car to travel in the second virtual map, the target virtual map and the second virtual racing car being selected by the first account before the round of racing game starts.

According to still another aspect of the embodiments of this application, a non-transitory computer-readable storage medium is further provided, storing a plurality of computer programs, the computer programs, when executed by a processor of a computer device, causing the computer device to perform the aforementioned map switching method.

According to still another aspect of the embodiments of this application, a computer device is further provided, including a memory, a processor, and a plurality of computer programs stored on the memory and executable on the processor, the processor performing the aforementioned map switching method by using the computer programs.

In the embodiments of this application, a user may log into a client by using a first account, to control a first virtual racing car to perform a round of racing game in the client. In a process that the client runs a round of racing game, a travel position of the first virtual racing car in a first virtual map of the round of racing game is obtained, and if it is determined that the travel position reaches a first teleporter in the first virtual map, the first virtual racing car is teleported from the first virtual map to a second virtual map in the round of racing game. In the foregoing method, after the first virtual racing car reaches a specified position, the first virtual racing car is switched to a different virtual map, to implement an effect of crossing over a plurality of virtual maps in a round of racing game and improve map richness in the racing game, thereby further resolving a technical problem of monotonous maps and poor richness of the racing game existing in the related art.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings:

FIG. 1 is a schematic diagram of an application environment of a map switching method according to an embodiment of this application.

FIG. 2 is a schematic flowchart of a map switching method according to an embodiment of this application.

DESCRIPTION OF EMBODIMENTS

Figure 3:
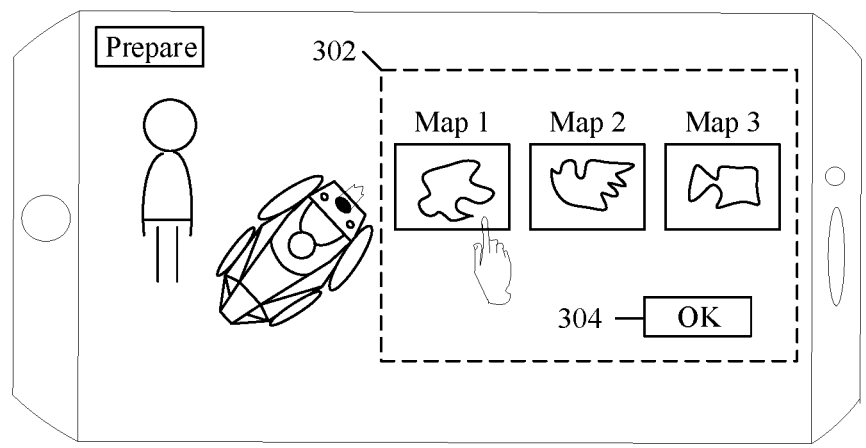
FIG. 3 is a schematic diagram of a map switching method according to an embodiment of this application.

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that the data used in this way may be interchanged in an appropriate case, so that the embodiments of this application described herein can be implemented in a sequence other than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, a map switching method is provided, and the map switching method is applicable to a game application scenario. In one implementation, the map switching method is applicable to, but not limited to, an environment shown in FIG. 1.

In FIG. 1, a user 102 may perform human-computer interaction with user equipment 104. The user equipment 104 includes a memory 106 configured to store interaction data and a processor 108 configured to process interaction data. The user equipment 104 and a server 112 may perform data exchange with each other by using a network 110. The server 112 includes a database 114 configured to store interaction data and a processing engine 116 configured to process interaction data. A client is run on the user equipment 104, the user 102 may log into the client by using a first account, and a racing game is run on the client. The user 102 may control a first virtual racing car 104-4 corresponding to the first account and on a first virtual map 104-2 in the racing game through human-computer interaction, and teleport the first virtual racing car from the first virtual map 104-2 to a second virtual map 104-8 in a case of detecting that a current travel position of the first virtual racing car 104-4 reaches a first teleporter 104-6.

In the related art, in a racing game, generally only one map can be selected before the game, and racing game is then performed by using the selected map. However, the foregoing method is monotonous in map and poor in richness. In this solution, when it is detected that the first virtual racing car corresponding to the first account in the racing game reaches a specified position, the first virtual racing car may be switched to a different virtual map, thereby resolving the problem of monotonous maps of the racing game and implementing an effect of enriching maps in the racing game.

In one implementation, the foregoing map switching method may be applicable to, but not limited to, terminals that can perform computing of data, for example, terminals such as a mobile phone, a tablet computer, a laptop computer, and a personal computer (PC). The network may include, but is not limited to, a wireless network or a wired network. The wireless network includes a wireless fidelity (Wi-Fi) network and other networks implementing wireless communication. The wired network may include, but is not limited to: a wide area network, a metropolitan area network, and a local area network. The server may include, but not limited to, any hardware device that can perform computation.

In one implementation, as shown in FIG. 2, the map switching method includes the following steps:

S202. Obtain a travel position of a first virtual racing car in a first virtual map in a process that a client runs a round of racing game, the first virtual racing car being controlled by a first account logged into the client, and the first virtual map being a virtual map in the round of racing game.

S204. Teleport the first virtual racing car from the first virtual map to a second virtual map in the round of racing game when the travel position reaches a first teleporter in the first virtual map, the first virtual map being connected to the second virtual map through the first teleporter, a virtual map used in the round of racing game being spliced by a plurality of virtual maps, and the plurality of virtual maps including the first virtual map and the second virtual map.

In one implementation, the map switching method may be applicable, but not limited, to the game field. The process corresponding to the round of racing game is launched for the client at the computer device before step S202. In this case, the plurality of virtual maps are spliced together as a complete virtual map for the round of racing game. In a process that the client to which the first account is logged in runs a game, when a position of the racing car controlled by the first account reaches a specified position, the racing car is teleported from one virtual map to another virtual map, to complete virtual map switching.

By using the foregoing method, when it is detected that the first virtual racing car corresponding to the first account in the racing game reaches a specified position, the first virtual racing car may be switched to a different virtual map, thereby resolving the problem of monotonous maps of the racing game and implementing an effect of enriching maps in the racing game.

In one implementation, a plurality of check points may be set on each virtual map in this embodiment, and a check point corresponding to a virtual racing car on a virtual map is a position of the virtual racing car on the virtual map. When the check point of the virtual racing car on the virtual map overlaps with the first teleporter, it may be considered that the virtual racing car moves to the first teleporter. The foregoing overlap may not necessarily be complete overlap and may alternatively be overlap with a relatively small error.

In one implementation, in this embodiment, after a plurality of players are matched together and before a racing game is started, a plurality of virtual maps may be further selected from a virtual map set. In this embodiment, the plurality of virtual maps may be randomly selected by a system, or the plurality of virtual maps may be selected by one or more players in the plurality of players participating in the racing game, and the plurality of virtual maps include the first virtual map and the second virtual map. For example, each player selects one virtual map, or only one or more players select one virtual map.

In one implementation, in this embodiment, after the plurality of virtual maps are selected, the plurality of virtual maps need to be spliced into a virtual map, and a splicing sequencing is random. After obtaining a total map by splicing the plurality of virtual maps, a round of racing game is performed by using the total map.

For example, as shown in FIG. 3, FIG. 3 is an interface display diagram of selecting a virtual map. A map display region 302 in FIG. 3 displays a plurality of virtual maps, and the user may select one virtual map in the map display region 302. In one implementation, after the user selects a virtual map, the selected virtual map may be determined by tapping an OK button 304. For example, if the user selects a map 1, the map 1 and other selected virtual maps are spliced into a total map for use in racing.

Figure 4:
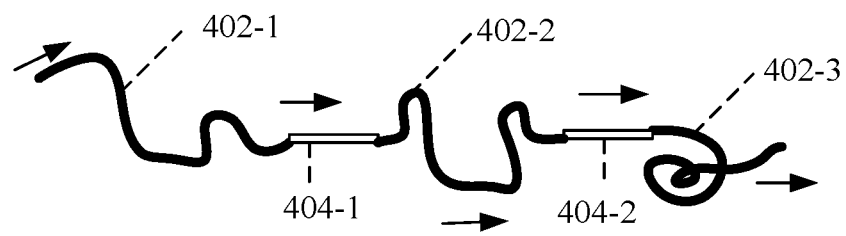
FIG. 4 is a schematic diagram of another map switching method according to an embodiment of this application.

In one implementation, in a process of splicing maps, a virtual tunnel may be disposed between two adjacent maps. In a process that the user controls the virtual racing car for racing, when the virtual racing car moves to an end point of a virtual map, the virtual racing car passes through the tunnel and reaches a starting point of another virtual map. For example, as shown in FIG. 4, FIG. 4 includes three virtual maps and two virtual tunnels. An end point of the first virtual map 402-1 is connected to a starting point of the first virtual tunnel 404-1, an end point of the first virtual tunnel 404-1 is connected to a starting point of the second virtual map 402-2, an end point of the second virtual map 402-2 is connected to a starting point of the second virtual tunnel 404-2, and an end point of the second virtual tunnel 404-2 is connected to a starting point of the third virtual map 402-3.

Figure 5:
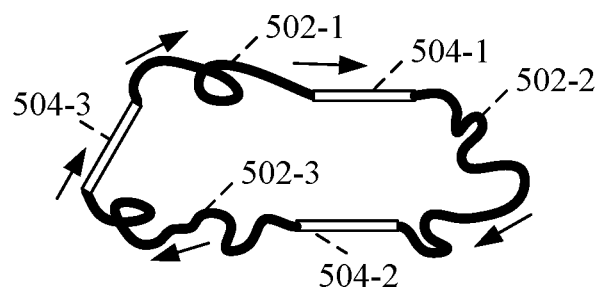
FIG. 5 is a schematic diagram of still another map switching method according to an embodiment of this application.

Alternatively, the virtual maps and the virtual tunnels in this embodiment may form a closed loop. For example, as shown in FIG. 5, FIG. 5 includes three virtual maps and three virtual tunnels. The virtual map 502-1, the virtual map 502-2, and the virtual map 502-3 are connected to each other by using the virtual tunnel 504-1, the virtual tunnel 504-2, and the virtual tunnel 504-3, to form a closed loop. The user needs to travel along a line for one cycle or several cycles.

Figure 6:
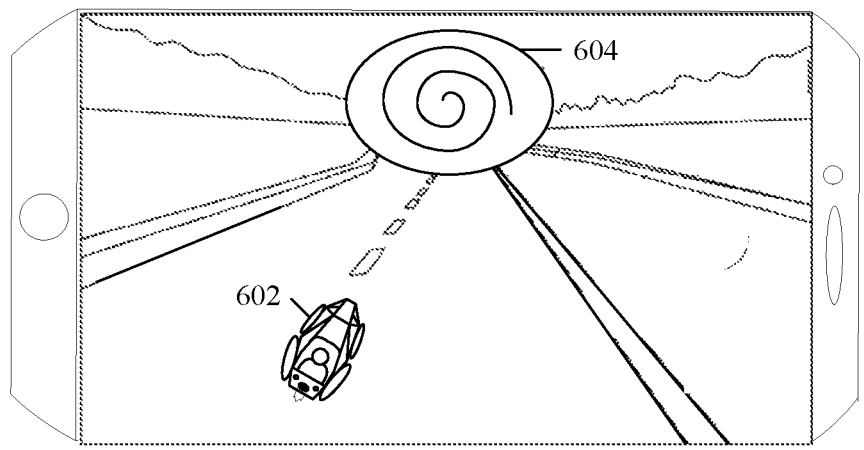
FIG. 6 is a schematic diagram of still another map switching method according to an embodiment of this application.

In one implementation, as shown in FIG. 6, FIG. 6 is a display manner of a virtual tunnel. In a round of racing game, a first virtual racing car 602 controlled by a first account moves in a first virtual map. An entry 604 of a virtual tunnel is displayed at an end of the first virtual map, and in a case of reaching the entry 604 of the virtual tunnel, the first virtual racing car enters the virtual tunnel.

Figure 7:
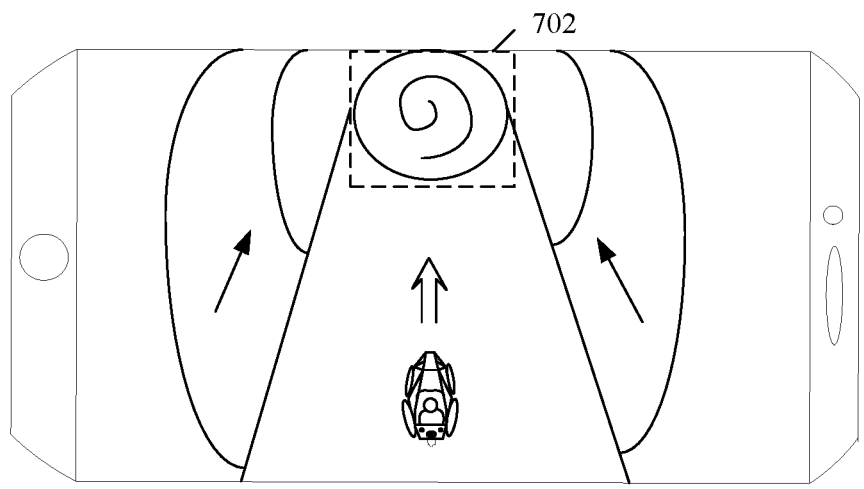
FIG. 7 is a schematic diagram of still another map switching method according to an embodiment of this application.

As shown in FIG. 7, FIG. 7 is an interface diagram of traveling in a virtual tunnel. 702 in FIG. 7 is an exit of the virtual tunnel.

In one implementation, after entering the virtual tunnel from the entry of the virtual tunnel, the first virtual racing car cannot exit the virtual tunnel from the entry of virtual tunnel and can move freely in the virtual tunnel until the first virtual racing car enters a second virtual map from the exit of the virtual tunnel.

Figure 8:
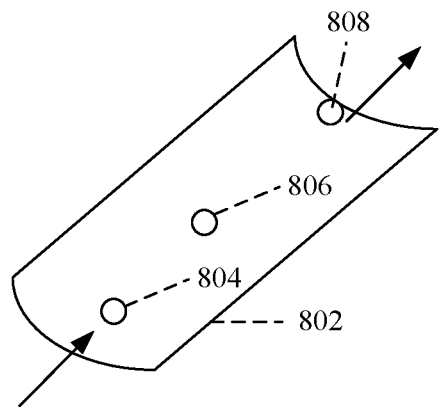
FIG. 8 is a schematic diagram of still another map switching method according to an embodiment of this application.

For example, as shown in FIG. 8, after the first virtual racing car enters the virtual tunnel 802 and passes through a check point 804, when the first virtual racing car retreats and triggers the check point 804, the first virtual racing car is reset to a reset point 806 to prevent the first virtual racing car from retreating to exit the virtual tunnel. After the first virtual racing car passes through a check point 808, the first virtual racing car travels out of the virtual tunnel and enters the second virtual map.

In one implementation, the resetting is to move a virtual racing car from one position to another position within a predetermined time period. In another example, in the foregoing embodiment, when a stay duration of the first virtual racing car in the virtual tunnel exceeds a predetermined duration, the first virtual racing car is teleported to a starting position of the second virtual map.

In one implementation, after the first virtual racing car enters the second virtual map, if the second virtual map is not a target virtual map selected by the first account corresponding to the first virtual racing car in this round of racing game, no extra setting is performed on the first virtual racing car, and the first virtual racing car may be controlled to normally perform a drift operation, accumulate nitrous oxide, use nitrous oxide, use a prop, and the like. If the second virtual map is a target virtual map selected by the first account corresponding to the first virtual racing car or a target virtual map selected by a teammate of the first account, and the first account selects a virtual racing car and/or a first ability corresponding to the target virtual map in advance, after the first virtual racing car enters the second virtual map, the first virtual racing car needs to be adjusted in this case.

For example, when the first account or a teammate of the first account selects a first ability in advance, after the first virtual racing car enters the second virtual map (the target virtual map), the first virtual racing car is permitted to use the first ability, and the first ability is forbidden for the first virtual racing car on other virtual maps.

Figure 9:
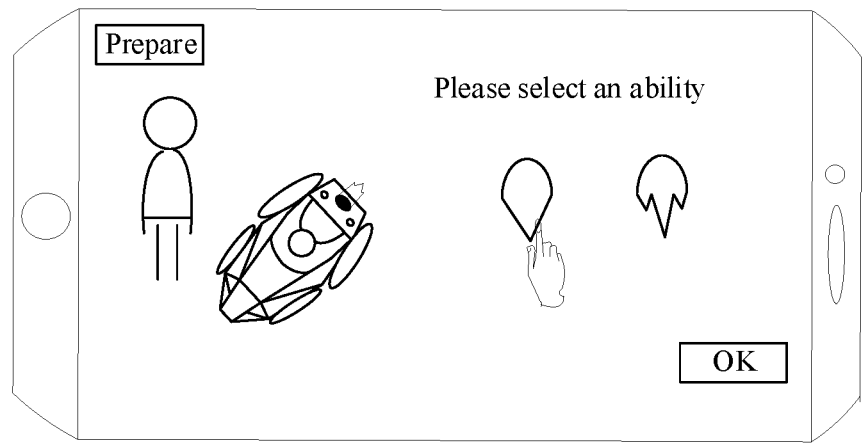
FIG. 9 is a schematic diagram of still another map switching method according to an embodiment of this application.

For example, as shown in FIG. 9, FIG. 9 is an ability selection interface, and the user may select a first ability from a plurality of abilities as an ability used in the target virtual map. When there is only one ability, the user may select whether to configure the first ability for the target virtual map.

Figure 10:
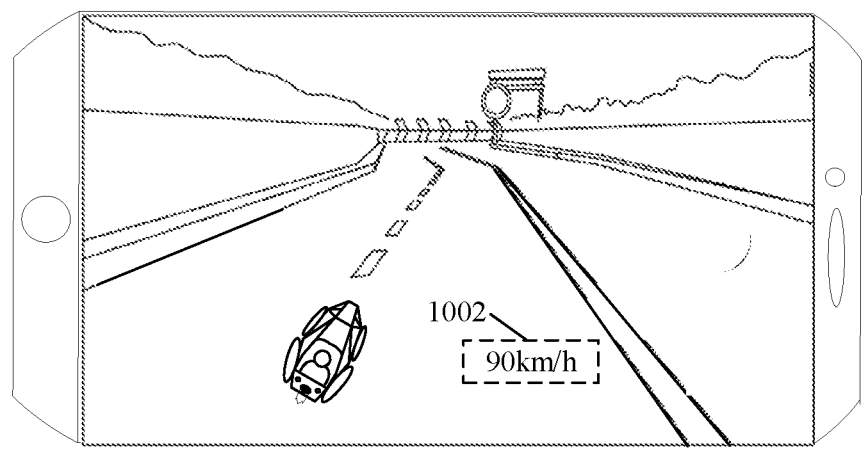
FIG. 10 is a schematic diagram of still another map switching method according to an embodiment of this application.
Figure 11:
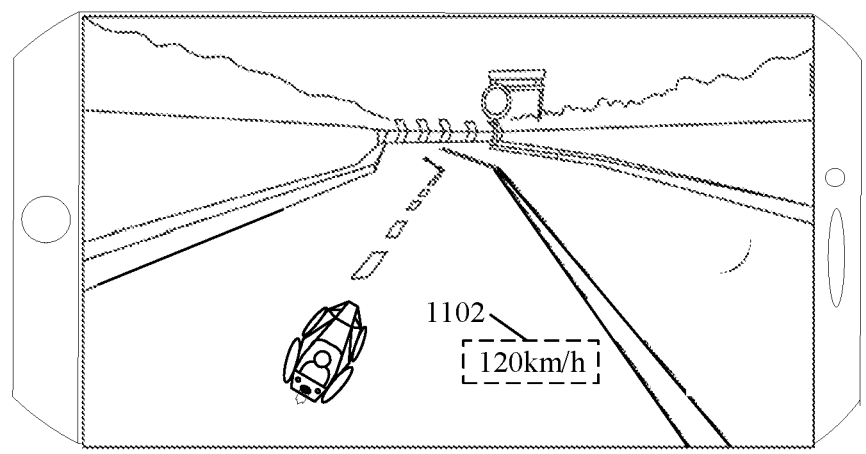
FIG. 11 is a schematic diagram of still another map switching method according to an embodiment of this application.

In one implementation, the first ability may be an ability improving a performance parameter such as a speed of the first virtual racing car. For example, as shown in FIG. 10 and FIG. 11, FIG. 10 is a situation that the second virtual map is not the target virtual map, and FIG. 11 is a situation that the second virtual map is the target virtual map. In FIG. 11, the first ability is activated for the first virtual racing car, so that a speed 1102 of the first virtual racing car is greater than a speed 1002 in FIG. 10 in which the first ability is not activated.

In one implementation, the first ability may be activated immediately when the second virtual map is entered and the second virtual map is the target virtual map, or may be activated when an activation instruction is received, for example, activated when an activation instruction of the user is received.

In one implementation, when the first virtual racing car enters the second virtual map and the second virtual map is the target virtual map, if the first account selects a second virtual racing car matching the target virtual map in advance, after the first virtual racing car enters the target virtual map, the first virtual racing car is replaced with the second virtual racing car, and after the second virtual racing car travels out of the target virtual map, the second virtual racing car is replaced with the first virtual racing car.

In one implementation, the second virtual racing car may be a racing car with performance better than that of the first virtual racing car, for example, a faster speed, a faster start, or a smaller collision impact.

Figure 12A:
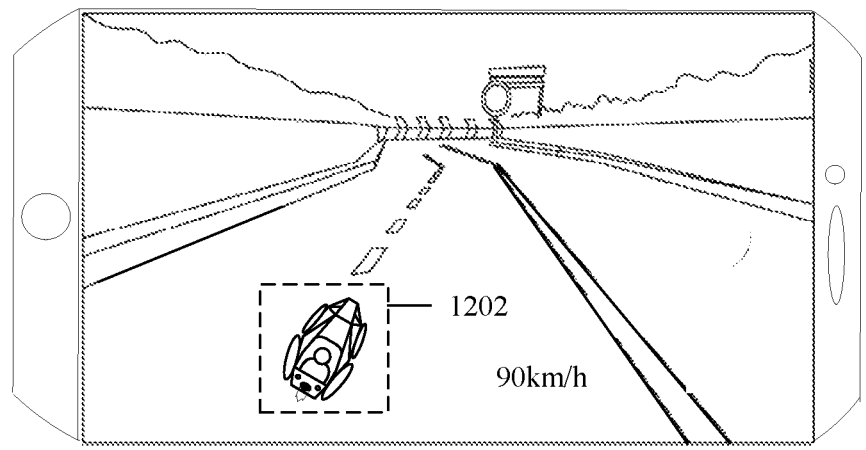
FIG. 12(a) and FIG. 12(b) are schematic diagrams of still another map switching method according to an embodiment of this application.
Figure 12B:
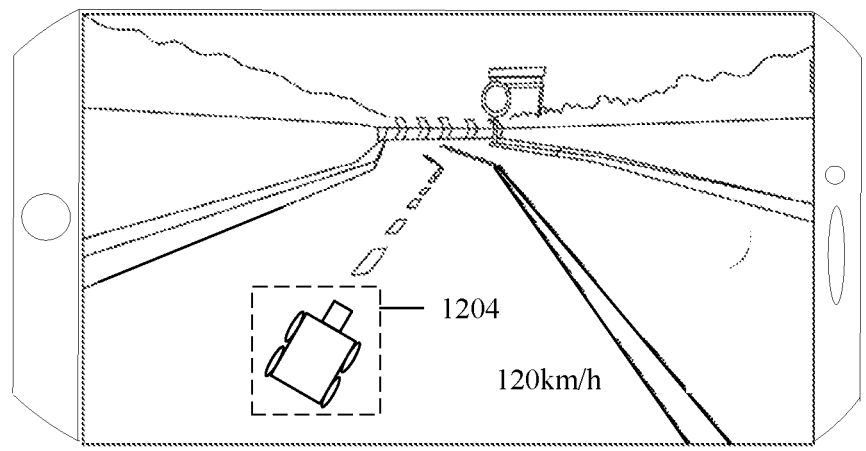

For example, as shown in FIG. 12(*a*) and FIG. 12(*b*), a map in FIG. 12(*a*) is not the target virtual map corresponding to the first account, and the first virtual racing car 1202 corresponding to the first account does not change; and a map in FIG. 12(*b*) is the target virtual map corresponding to the first account, and the first virtual racing car corresponding to the first account is replaced with the second virtual racing car 1204. A speed of the second virtual racing car 1204 is greater than a speed of the first virtual racing car.

Figure 13:
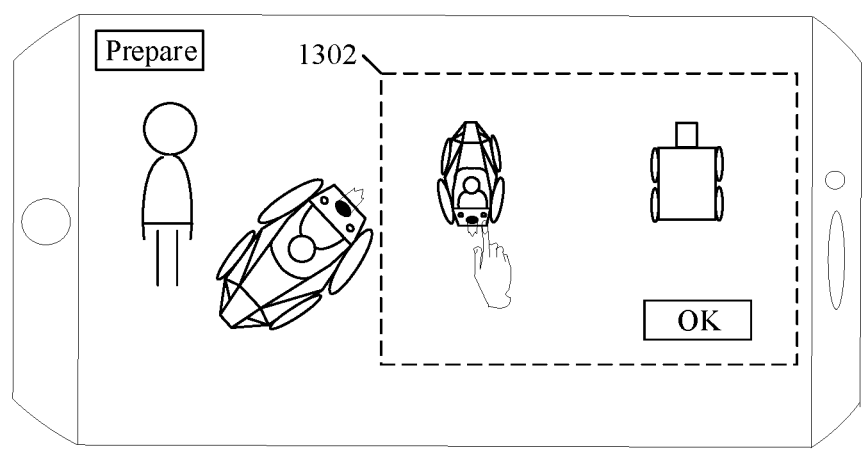
FIG. 13 is a schematic diagram of still another map switching method according to an embodiment of this application.

In one implementation, the user may select the second virtual racing car corresponding to the target virtual map in advance. For example, as shown in FIG. 13, the user may select a virtual racing car in a virtual racing car selection region 1302 as the second virtual racing car used in the target virtual map.

In one implementation, in this embodiment, a team ability may be further configured for the first account and a teammate of the first account, and the team ability needs to be triggered by the first account and the teammate of the first account jointly. For example, a team nitrous oxide slot is set, and energy may be added to the team nitrous oxide slot when the first virtual racing car (or the second virtual racing car in the target virtual map) corresponding to the first account and a third virtual racing car controlled by the teammate of the first account perform a drift operation. When the team nitrous oxide slot is full of energy, nitrous oxide is configured for the first account and a second account simultaneously.

Figure 14:
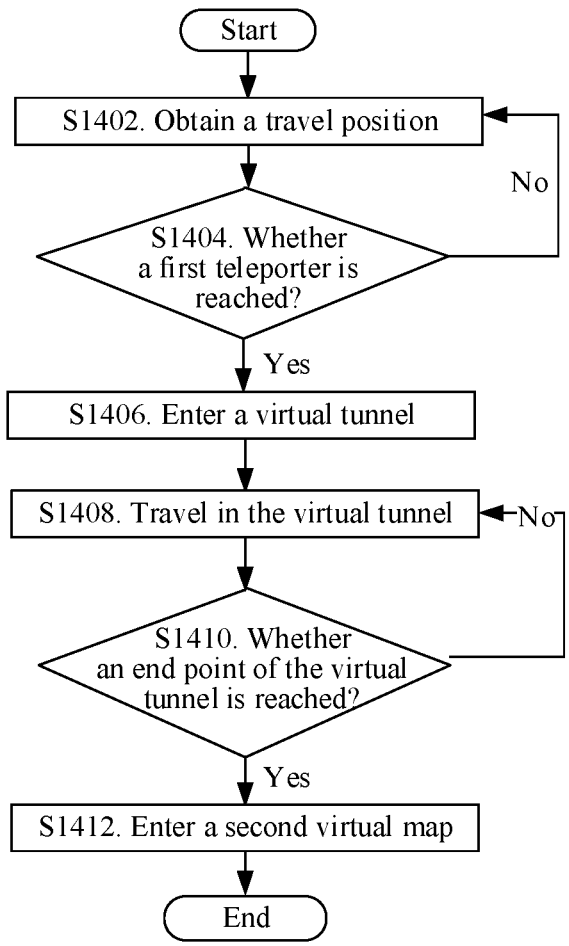
FIG. 14 is a schematic flowchart of another map switching method according to an embodiment of this application.

Description is made below on the map switching method with reference to S1402 to S1412 in FIG. 14. As shown in FIG. 14, the method includes the following steps:

S1402. Obtain a travel position.

In a process that a first virtual racing car travels in a first virtual map, a travel position of the first virtual racing car is obtained.

S1404. Whether a first teleporter is reached. If yes, S1406 is performed. If no, S1402 is performed.

S1406. Enter a virtual tunnel.

If the travel position reaches the first teleporter, the first virtual racing car is teleported into the virtual tunnel.

S1408. Travel in the virtual tunnel.

S1410. Whether an end point of the virtual tunnel is reached, if yes, S1412 is performed, and if no, S1408 is performed.

S1412. Enter a second virtual map.

When the first virtual racing car reaches the end point of the virtual tunnel, the first virtual racing car is teleported into the second virtual map. In this case, virtual map switching is completed.

According to the method in this embodiment, in a case of detecting that the travel position of the first virtual racing car reaches the first teleporter, the first virtual racing car may be teleported from the first virtual map to the second virtual map, thereby implementing an effect of crossing over a plurality of virtual maps in a round of racing game and improving map richness in the racing game.

In one implementation, after the first virtual racing car is teleported from the first virtual map to the second virtual map in a round of racing game, the method further includes:

S1, switching a virtual racing car controlled by the first account in the second virtual map from the first virtual racing car to a second virtual racing car when the second virtual map is a target virtual map, and controlling the second virtual racing car to travel in the second virtual map, the target virtual map being a virtual map selected by the first account before the round of racing game starts, and the second virtual racing car being a virtual racing car selected by the first account to travel on the target virtual map before the round of racing game starts.

For example, a case that the first account selects a second virtual racing car with better performance in advance is used as an example, after the first virtual racing car controlled by the first account reaches the second virtual map, if the second virtual map is the target virtual map selected by the first account in advance, in this case, the first virtual racing car is replaced with the second virtual racing car, and after the second virtual racing car travels out of the second virtual map, the second virtual racing car is restored back to the first virtual racing car.

According to the method in this embodiment, by replacing the virtual racing car, gameplay flexibility of the racing game is improved while maps in the racing game are enriched.

In one implementation, in a case of controlling the second virtual racing car to travel in the second virtual map, the method further includes:

S1, activating a first ability configured for the second virtual racing car on the client, the first ability being configured to improve a performance parameter of the second virtual racing car, and the first ability being an ability selected by the first account before the round of racing game starts and automatically activated or activated by an activation instruction on the target virtual map.

For example, a case that the first ability is an acceleration ability is used as an example, after the first virtual racing car controlled by the first account reaches the second virtual map, if the second virtual map is the target virtual map selected by the first account in advance, when the first virtual racing car has been replaced with the second virtual racing car, the second virtual racing car further needs to be accelerated in this case. If the acceleration ability is an automatically triggered ability, the second virtual racing car is accelerated on the second virtual map all the way; and if the acceleration ability is an actively triggered ability, the second virtual racing car is accelerated after an acceleration instruction of the user is received.

According to the method in this embodiment, by accelerating the second virtual racing car, gameplay flexibility of the racing game is improved while maps in the racing game are enriched.

In one implementation, after the first virtual racing car is teleported from the first virtual map to the second virtual map in a round of racing game, the method further includes:

S1, controlling the first virtual racing car to travel in the second virtual map; and S2, activating a second ability configured for the first virtual racing car on the client when the second virtual map is a target virtual map, the target virtual map being a virtual map selected by the first account before the round of racing game starts, the second ability being configured to improve a performance parameter of the first virtual racing car, and the second ability being an ability selected by the first account before the round of racing game starts and automatically activated or activated by an activation instruction on the target virtual map.

For example, in this embodiment, if only the second ability is selected in advance, and a virtual racing car corresponding to the target virtual map is not selected, in this case, after the first virtual racing car controlled by the first account enters the second virtual map and the second virtual map is the target virtual map corresponding to the first account, the second ability is automatically activated for the first virtual racing car, or the second ability is activated when an activation instruction is received. The second ability may be an ability accelerating the first virtual racing car or increase various parameters of the first virtual racing car.

According to this embodiment, by configuring a second ability for the first virtual racing car when the second ability is selected in advance, gameplay flexibility of the racing game is improved while maps in the racing game are enriched.

In one implementation, after the first virtual racing car is teleported from the first virtual map to the second virtual map in a round of racing game, the method further includes:
S1, using the first virtual racing car as a virtual racing car controlled by the first account in the second virtual map when the second virtual map is different from a target virtual map, and controlling the first virtual racing car to travel in the second virtual map, the target virtual map being a virtual map selected by the first account before the round of racing game starts.

In this embodiment, the second virtual map is not the target virtual map corresponding to the first account, in this case, the first virtual racing car of the first account is not adjusted, and original parameters of the first virtual racing car are maintained.

According to this embodiment, by still maintaining performance parameters of the first virtual racing car when the second virtual map is not the target virtual map corresponding to the first account, game fairness is ensured while maps in the racing game are enriched.

In one implementation, in a case of controlling the first virtual racing car to travel in the second virtual map, the method further includes:
S1, activating, in a case of receiving an activation instruction used for activating a third ability, the third ability on the client, the third ability being an ability configured for the first virtual racing car on the second virtual map, and the third ability including an ability configured for the first virtual racing car on the first virtual map.

In one implementation, when the second virtual map is not the target virtual map corresponding to the first account, the first account can still perform operations such as a drift operation, an acceleration operation performed by using nitrous oxide, or using a prop on the first virtual racing car. However, in this case, the first virtual racing car is not replaced with the second virtual racing car, and no extra ability is configured for the first virtual racing car.

According to the method in this embodiment, fairness of the racing game is improved while maps in the racing game are enriched.

In one implementation, the method further includes:
S1, selecting a plurality of virtual maps including the first virtual map and the second virtual map from a virtual map set before a round of racing game starts; and
S2, splicing the plurality of virtual maps into a virtual map used in the round of racing game.

In one implementation, in this embodiment, if there is a second account that is in a same group or a same team or a same camp with the first account, any account of the first account and the second account may select a virtual map, or only one account in a team selects a virtual map. When the virtual map is selected by one account, virtual maps selected by accounts in the same team or group or camp are spliced into a total map, and the total map is used in a round of racing game for racing.

In one implementation, the splicing process may be executed by a client or a server. For example, after a server receives virtual maps reported by clients, the server splices the virtual maps into a total map and then distributes the total map to the clients.

According to the method in this embodiment, flexibility in selecting virtual maps is improved while maps in the racing game are enriched.

In one implementation, the method further includes:
S1, receiving a first instruction of the first account before a round of racing game starts, the first instruction being used for selecting one virtual map from a plurality of virtual maps as the target virtual map of the first account, and the plurality of virtual maps being spliced into a virtual map used in the round of racing game.

In one implementation, in this embodiment, if there is a second account that is in a same group or a same team or a same camp with the first account, a virtual map selected by any account of the first account and the second account may be used as a target virtual map of the first account and the second account, and in this way, there is no need that each account selects a virtual map.

According to the method in this embodiment, flexibility in selecting virtual maps is improved while maps in the racing game are enriched.

In one implementation, the method further includes:
S1, receiving a second instruction of the first account before a round of racing game starts, the second instruction being used for selecting a virtual racing car used on the target virtual map from a plurality of virtual racing cars for the first account.

In one implementation, in this embodiment, if there is a second account that is in a same group or a same team or a same camp with the first account, a virtual racing car selected by any account of the first account and the second account may be used as a virtual racing car used by the first account and the second account on the target virtual map, and in this way, there is no need that each account selects a virtual racing car. Alternatively, one account may select a target virtual map, and another account selects a virtual racing car used on the target virtual map.

According to the method in this embodiment, flexibility in selecting virtual racing cars is improved while maps in the racing game are enriched.

In one implementation, the method further includes:
S1, receiving a third instruction of the first account before a round of racing game starts, the third instruction being used for configuring an ability on the target virtual map for the first account.

In one implementation, if there is a second account that is in a same group or a same team or a same camp with the first account, an ability selected by any account of the first account and the second account may be used as an ability used by the first account and the second account on the target virtual map, and in this way, there is no need that each account selects an ability. One account may select a target virtual map, and another account selects an ability used on the target virtual map.

According to the method in this embodiment, flexibility in selecting abilities is improved while maps in the racing game are enriched.

In one implementation, the method further includes:

S1, activating, in a case of obtaining a fourth instruction of the first account, a fourth ability of the first account in a process of a round of racing game, the fourth ability being configured to improve a performance parameter of the first virtual racing car, the fourth ability being an ability configured for the first account and the second account, and the second account and the first account being in a same camp.

In one implementation, in this embodiment, a team ability is configured for the first account and the second account being in a same camp with the first account. The team ability is an ability that may be used by all accounts in the same camp, and is also an ability that can only be obtained through cooperation of all the accounts in the same camp. For example, when the first account and the second account are in the same camp, the first account and the second account correspond to a team nitrous oxide slot, nitrous oxide in the team nitrous oxide slot may be increased when the first account performs a drift operation or the second account performs a drift operation, and when a nitrous oxide value in the team nitrous oxide slot is full or reaches a predetermined threshold, nitrous oxide is configured for the first account and the second account simultaneously.

According to the method in this embodiment, flexibility of ability configurations is improved while maps in the racing game are enriched.

In one implementation, in a process that a client to which the first account is logged in runs a round of racing game, after a travel position in a first virtual map of a first virtual racing car controlled by the first account in the first virtual map in the round of racing game, the method further includes:

S1, reporting the travel position to a server.

In one implementation, a plurality of check points may be set on each virtual map in this embodiment. When the first virtual racing car travels on a virtual map, a check point on which the first virtual racing car is located may be detected. The check point on which the first virtual racing car is located is reported to a server, so that the server knows a position of the first virtual racing car.

Figure 15:
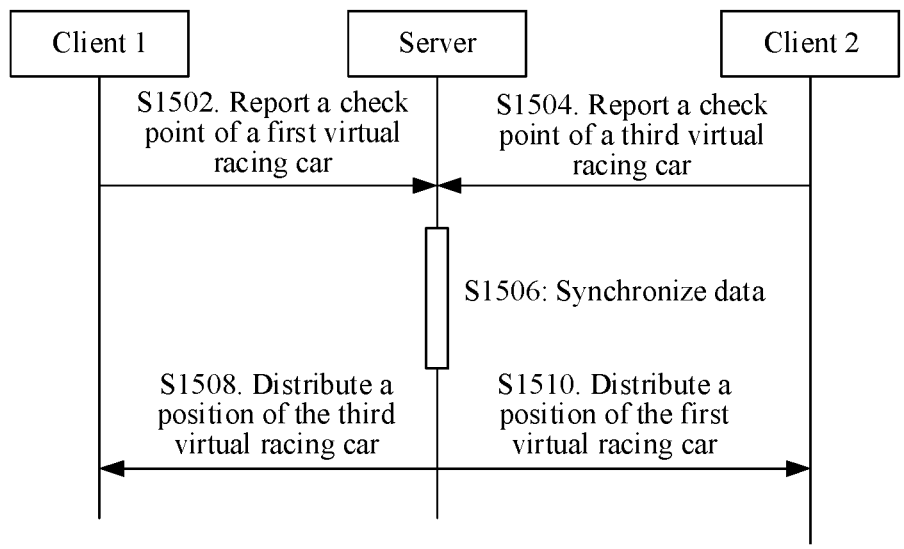
FIG. 15 is a schematic diagram of still another map switching method according to an embodiment of this application.

The following describes a method for performing data synchronization by using a server. As shown in FIG. 15, the method includes:

S1502. Report a check point of a first virtual racing car.

S1504. Report a check point of a third virtual racing car.

A client 1 to which the first account is logged in reports a racing car check point of the first virtual racing car controlled by the first account to the server, and a client 2 to which the second account is logged in reports a position of a check point of the third virtual racing car controlled by the second account to the server.

S1506. Synchronize data.

The server implements position synchronization of the first virtual racing car and the third virtual racing car.

S1508. Distribute a position of the third virtual racing car.

S1510. Distribute a position of the first virtual racing car.

The server then distributes the position of the third virtual racing car to the client 1 and distributes the position of the first virtual racing car to the client 2, so that the client to which the first account is logged in may display the position of the third virtual racing car controlled by the second account.

Figure 16:
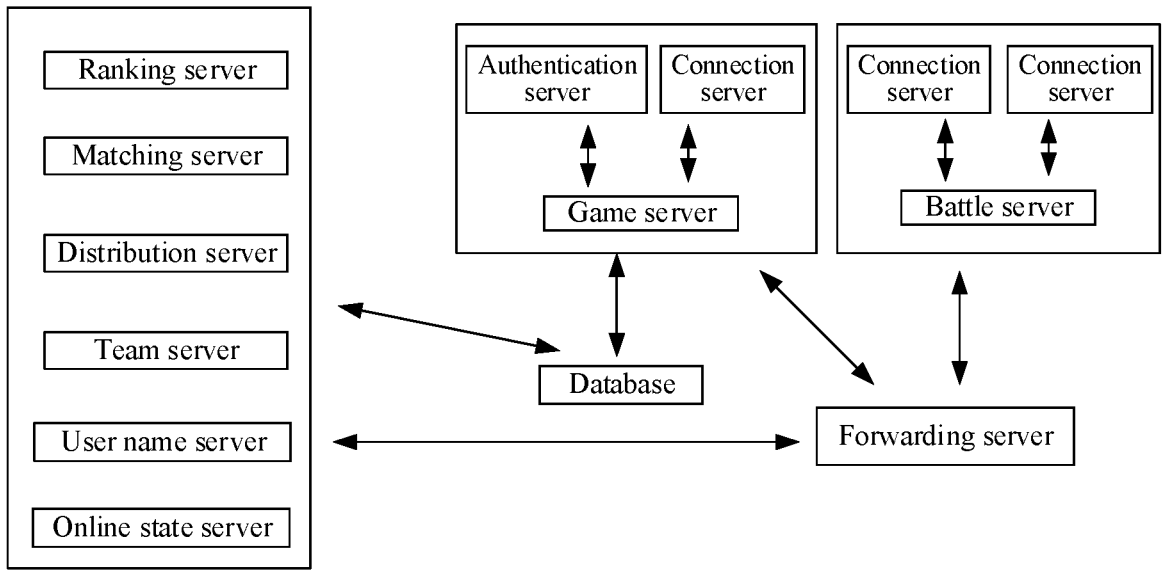
FIG. 16 is a schematic diagram of still another map switching method according to an embodiment of this application.

In this embodiment, running of a racing game is ensured by using the server in FIG. 16. A ranking server is responsible for ranking places of a plurality of accounts, a matching server is responsible for matching opponents in a racing game, a distribution server is configured to distribute a room for matched players, a team server is responsible for managing team information, a user name server is configured to manage information such as user names and passwords, and an online state server is configured to manage a state after an account is logged in. An authentication server is configured to authenticate whether a password of an account is correct, and a connection server connects the account to a game server when the password is correct. After a plurality of accounts are connected to a battle server through the connection server, the battle server is responsible for multiplayer battle. A forwarding server is configured to forward data generated by the racing game, and a database is configured to store the data generated by the racing game.

According to this embodiment, by reporting positions of virtual racing cars to a server, positions of virtual racing cars of different accounts may be synchronized and displayed, thereby ensuring data synchronization while enriching map richness of the racing game.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Description is made below with reference to a game. After a player selects a home map and a home car/home ability in a selection stage, a backend records the selection of the player and distributes the selections to clients in an opening packet.

A map in a client is segmented into sections, and each section corresponds to a check point. A traveling mode splices three maps with two teleporting tunnels, and merges five maps into a larger map.

When a game starts, the client reports a check point in which a virtual racing car is currently located at an interval of a predetermined time, the backend compares the check point with a teleporter in a configuration, and if it is determined that the virtual racing car reaches the teleporter, a current player is teleported into a teleporting tunnel and then teleported into a next map through the teleporting tunnel. The backend records the home map and the home car/ability selected by the player, after the player is teleported to the home map, if a home car is selected, the backend triggers characteristics of the new car. In addition, if a home ability is selected, the player may alternatively enjoy the home ability in the home map.

A team ability is shared by a team, the backend records a progress value of the team ability for each team, and the progress value may be increased after any player in a team drifts and collects nitrous oxide. When the progress value is full, a team ability is generated for two players in the team.

Figure 17:
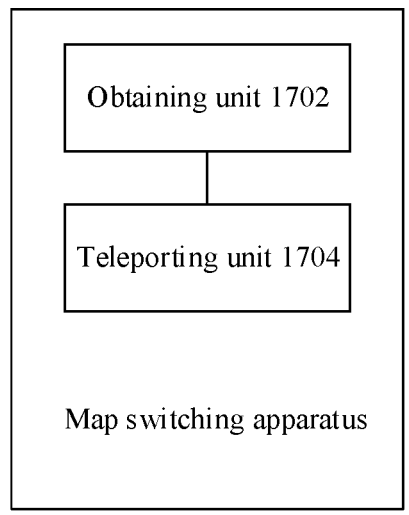
FIG. 17 is a schematic structural diagram of a map switching apparatus according to an embodiment of this application.

According to another aspect of the embodiments of this application, a map switching apparatus for implementing the foregoing map switching method is further provided. As shown in FIG. 17, the apparatus includes:

(1) an obtaining unit 1702, configured to obtain a travel position of a first virtual racing car in a first virtual map in a process that a client runs a round of racing game, the first virtual racing car being controlled by a first account logged into the client, and the first virtual map being a virtual map in the round of racing game; and (2) a teleporting unit 1704, configured to teleport the first virtual racing car from the first virtual map to a second virtual map in the round of racing game when the travel position reaches a first teleporter in the first virtual map, the first virtual map being connected to the second virtual map through the first teleporter, a virtual map used in the round of racing game being spliced by a plurality of virtual maps, and the plurality of virtual maps including the first virtual map and the second virtual map.

In one implementation, a client may run on the apparatus, and the client may run a racing game.

In one implementation, the map switching apparatus may be applicable, but not limited, to the game field. In a process that the client to which the first account is logged in runs a game, when a position of the racing car controlled by the first account reaches a specified position, the racing car is teleported from one virtual map to another virtual map, to complete virtual map switching.

By using the foregoing method, when it is detected that the first virtual racing car corresponding to the first account in the racing game reaches a specified position, the first virtual racing car may be switched to a different virtual map, thereby resolving the problem of monotonous maps of the racing game and implementing an effect of enriching maps in the racing game.

In one implementation, a plurality of check points may be set on each virtual map in this embodiment, and a check point corresponding to a virtual racing car on a virtual map is a position of the virtual racing car on the virtual map. When the check point of the virtual racing car on the virtual map overlaps with the first teleporter, it may be considered that the virtual racing car moves to the first teleporter. The foregoing overlap may not necessarily be complete overlap and may alternatively be overlap with a relatively small error.

In one implementation, in this embodiment, after a plurality of players are matched together and before a racing game is started, a plurality of virtual maps may be further selected from a virtual map set. In this embodiment, the plurality of virtual maps may be randomly selected by a system, or the plurality of virtual maps may be selected by one or more players in the plurality of players participating in the racing game, and the plurality of virtual maps include the first virtual map and the second virtual map. For example, each player selects one virtual map, or only one or more players select one virtual map.

In one implementation, in this embodiment, after the plurality of virtual maps are selected, the plurality of virtual maps need to be spliced into a virtual map, and a splicing sequencing is random. After obtaining a total map by splicing the plurality of virtual maps, a round of racing game is performed by using the total map.

For example, as shown in FIG. 3, FIG. 3 is an interface display diagram of selecting a virtual map. A map display region 302 in FIG. 3 displays a plurality of virtual maps, and the user may select one virtual map in the map display region 302. In one implementation, after the user selects a virtual map, the selected virtual map may be determined by tapping an OK button 304. For example, if the user selects a map 1, the map 1 and other selected virtual maps are spliced into a total map for use in racing.

In one implementation, in a process of splicing maps, a virtual tunnel may be disposed between two adjacent maps. In a process that the user controls the virtual racing car for racing, when the virtual racing car moves to an end point of a virtual map, the virtual racing car passes through the tunnel and reaches a starting point of another virtual map. For example, as shown in FIG. 4, FIG. 4 includes three virtual maps and two virtual tunnels. An end point of the first virtual map 402-1 is connected to a starting point of the first virtual tunnel 404-1, an end point of the first virtual tunnel 404-1 is connected to a starting point of the second virtual map 402-2, an end point of the second virtual map 402-2 is connected to a starting point of the second virtual tunnel 404-2, and an end point of the second virtual tunnel 404-2 is connected to a starting point of the third virtual map 402-3.

Alternatively, the virtual maps and the virtual tunnels in this embodiment may form a closed loop. For example, as shown in FIG. 5, FIG. 5 includes three virtual maps and three virtual tunnels. The virtual map 502-1, the virtual map 502-2, and the virtual map 502-3 are connected to each other by using the virtual tunnel 504-1, the virtual tunnel 504-2, and the virtual tunnel 504-3, to form a closed loop. The user needs to travel along a line for one cycle or several cycles.

In one implementation, as shown in FIG. 6, FIG. 6 is a display manner of a virtual tunnel. In a round of racing game, a first virtual racing car 602 controlled by a first account moves in a first virtual map. An entry 604 of a virtual tunnel is displayed at an end of the first virtual map, and in a case of reaching the entry 604 of the virtual tunnel, the first virtual racing car enters the virtual tunnel.

As shown in FIG. 7, FIG. 7 is an interface diagram of traveling in a virtual tunnel. 702 in FIG. 7 is an exit of the virtual tunnel.

In one implementation, after entering the virtual tunnel from the entry of the virtual tunnel, the first virtual racing car cannot exit the virtual tunnel from the entry of virtual tunnel and can move freely in the virtual tunnel until the first virtual racing car enters a second virtual map from the exit of the virtual tunnel.

For example, as shown in FIG. 8, after the first virtual racing car enters the virtual tunnel 802 and passes through a check point 804, when the first virtual racing car retreats and triggers the check point 804, the first virtual racing car is reset to a reset point 806 to prevent the first virtual racing car from retreating to exit the virtual tunnel. After the first virtual racing car passes through a check point 808, the first virtual racing car travels out of the virtual tunnel and enters the second virtual map.

In one implementation, the resetting is to move a virtual racing car from one position to another position within a predetermined time period. In another example, in the foregoing embodiment, when a stay duration of the first virtual racing car in the virtual tunnel exceeds a predetermined duration, the first virtual racing car is teleported to a starting position of the second virtual map.

In one implementation, after the first virtual racing car enters the second virtual map, if the second virtual map is not a target virtual map selected by the first account corresponding to the first virtual racing car in this round of racing game, no extra setting is performed on the first virtual racing car, and the first virtual racing car may be controlled to normally perform a drift operation, accumulate nitrous oxide, use nitrous oxide, use a prop, and the like. If the second virtual map is a target virtual map selected by the first account corresponding to the first virtual racing car or a target virtual map selected by a teammate of the first account, and the first account selects a virtual racing car and/or a first ability corresponding to the target virtual map in advance, after the first virtual racing car enters the second virtual map, the first virtual racing car needs to be adjusted in this case.

For example, when the first account or a teammate of the first account selects a first ability in advance, after the first virtual racing car enters the second virtual map (the target virtual map), the first virtual racing car is permitted to use the first ability, and the first ability is forbidden for the first virtual racing car on other virtual maps.

For example, as shown in FIG. 9, FIG. 9 is an ability selection interface, and the user may select a first ability from a plurality of abilities as an ability used in the target virtual map. When there is only one ability, the user may select whether to configure the first ability for the target virtual map.

In one implementation, the first ability may be an ability improving a performance parameter such as a speed of the first virtual racing car. For example, as shown in FIG. 10 and FIG. 11, FIG. 10 is a situation that the second virtual map is not the target virtual map, and FIG. 11 is a situation that the second virtual map is the target virtual map. In FIG. 11, the first ability is activated for the first virtual racing car, so that a speed 1102 of the first virtual racing car is greater than a speed 1002 in FIG. 10 in which the first ability is not activated.

In one implementation, the first ability may be activated immediately when the second virtual map is entered and the second virtual map is the target virtual map, or may be activated when an activation instruction is received, for example, activated when an activation instruction of the user is received.

In one implementation, when the first virtual racing car enters the second virtual map and the second virtual map is the target virtual map, if the first account selects a second virtual racing car matching the target virtual map in advance, after the first virtual racing car enters the target virtual map, the first virtual racing car is replaced with the second virtual racing car, and after the second virtual racing car travels out of the target virtual map, the second virtual racing car is replaced with the first virtual racing car.

In one implementation, the second virtual racing car may be a racing car with performance better than that of the first virtual racing car, for example, a faster speed, a faster start, or a smaller collision impact.

For example, as shown in FIG. 12(*a*) and FIG. 12(*b*), a map in FIG. 12(*a*) is not the target virtual map corresponding to the first account, and the first virtual racing car 1202 corresponding to the first account does not change; and a map in FIG. 12(*b*) is the target virtual map corresponding to the first account, and the first virtual racing car corresponding to the first account is replaced with the second virtual racing car 1204. A speed of the second virtual racing car 1204 is greater than a speed of the first virtual racing car.

In one implementation, the user may select the second virtual racing car corresponding to the target virtual map in advance. For example, as shown in FIG. 13, the user may select a virtual racing car in a virtual racing car selection region 1302 as the second virtual racing car used in the target virtual map.

In one implementation, in this embodiment, a team ability may be further configured for the first account and a teammate of the first account, and the team ability needs to be triggered by the first account and the teammate of the first account jointly. For example, a team nitrous oxide slot is set, and energy may be added to the team nitrous oxide slot when the first virtual racing car (or the second virtual racing car in the target virtual map) corresponding to the first account and a third virtual racing car controlled by the teammate of the first account perform a drift operation. When the team nitrous oxide slot is full of energy, nitrous oxide is configured for the first account and a second account simultaneously.

Description is made below on the map switching method with reference to S1402 to S1412 in FIG. 14. As shown in FIG. 14, the method includes the following steps:

S1402. Obtain a travel position.

In a process that a first virtual racing car travels in a first virtual map, a current travel position of the first virtual racing car is obtained.

S1404. Whether a first teleporter is reached. If yes, S1406 is performed. If no, S1402 is performed.

S1406. Enter a virtual tunnel.

If the travel position reaches the first teleporter, the first virtual racing car is teleported into the virtual tunnel.

S1408. Travel in the virtual tunnel.

S1410. Whether an end point of the virtual tunnel is reached, if yes, S1412 is performed, and if no, S1408 is performed.

S1412. Enter a second virtual map.

When the first virtual racing car reaches the end point of the virtual tunnel, the first virtual racing car is teleported into the second virtual map. In this case, virtual map switching is completed.

According to the method in this embodiment, in a case of detecting that the travel position of the first virtual racing car reaches the first teleporter, the first virtual racing car may be teleported from the first virtual map to the second virtual map, thereby implementing an effect of crossing over a plurality of virtual maps in a round of racing game and improving map richness in the racing game.

In one implementation, the apparatus further includes:

(1) a switching unit, configured to switch, after the first virtual racing car is teleported from the first virtual map to the second virtual map in the round of racing game, a virtual racing car controlled by the first account in the second virtual map from the first virtual racing car to a second virtual racing car when the second virtual map is a target virtual map, and control the second virtual racing car to travel in the second virtual map, the target virtual map being a virtual map selected by the first account before the round of racing game starts, and the second virtual racing car being a virtual racing car selected by the first account to travel on the target virtual map before the round of racing game starts.

According to the method in this embodiment, by replacing the virtual racing car, gameplay flexibility of the racing game is improved while maps in the racing game are enriched.

In one implementation, the apparatus further includes:

(1) a configuration unit, configured to activate, in a case of controlling the second virtual racing car to travel in the second virtual map, a first ability configured for the second virtual racing car on the client, the first ability being an ability selected by the first account before the round of racing game starts and automatically activated or activated by an activation instruction on the target virtual map.

According to the method in this embodiment, by accelerating the second virtual racing car, gameplay flexibility of the racing game is improved while maps in the racing game are enriched.

In one implementation, the apparatus further includes:

(1) a control unit, configured to control the first virtual racing car to travel in the second virtual map after the first virtual racing car is teleported from the first virtual map to the second virtual map in the round of racing game; and (2) a first activation unit, configured to activate a second ability configured for the first virtual racing car on the client when the second virtual map is a target virtual map, the target virtual map being a virtual map selected by the first account before the round of racing game starts, and the second ability being an ability selected by the first account before the round of racing game starts and automatically activated or activated by an activation instruction on the target virtual map.

According to this embodiment, by configuring a second ability for the first virtual racing car when the second ability is selected in advance, gameplay flexibility of the racing game is improved while maps in the racing game are enriched.

In one implementation, the apparatus further includes:

(1) a determining unit, configured to use, after the first virtual racing car is teleported from the first virtual map to the second virtual map in the round of racing game, the first virtual racing car as a virtual racing car controlled by the first account in the second virtual map when the second virtual map is different from a target virtual map, and control the first virtual racing car to travel in the second virtual map, the target virtual map being a virtual map selected by the first account before the round of racing game starts.

According to this embodiment, by still maintaining performance parameters of the first virtual racing car when the second virtual map is not the target virtual map corresponding to the first account, game fairness is ensured while maps in the racing game are enriched.

In one implementation, the apparatus further includes:

(1) a second activation unit, configured to activate, in a case of receiving an activation instruction used for activating a third ability, the third ability on the client in a case of controlling the first virtual racing car to travel in the second virtual map, the third ability being an ability configured for the first virtual racing car on the second virtual map, and the third ability including an ability configured for the first virtual racing car on the first virtual map.

According to the method in this embodiment, fairness of the racing game is improved while maps in the racing game are enriched.

In one implementation, the apparatus further includes:

(1) a selection unit, configured to select a plurality of virtual maps including the first virtual map and the second virtual map from a virtual map set before a round of racing game starts; and (2) a splicing unit, configured to splice the plurality of virtual maps into a virtual map used in the round of racing game.

According to the method in this embodiment, flexibility in selecting virtual maps is improved while maps in the racing game are enriched.

In one implementation, the apparatus further includes:

(1) a first receiving unit, configured to receive a first instruction of the first account before a round of racing game starts, the first instruction being used for selecting one virtual map from the plurality of virtual maps as the target virtual map of the first account, and the plurality of virtual maps being spliced into the virtual map used in the round of racing game.

According to the method in this embodiment, flexibility in selecting virtual maps is improved while maps in the racing game are enriched.

In one implementation, the apparatus further includes:

(1) a second receiving unit, configured to receive a second instruction of the first account before a round of racing game starts, the second instruction being used for selecting a virtual racing car used on the target virtual map from a plurality of virtual racing cars for the first account.

According to the method in this embodiment, flexibility in selecting virtual racing cars is improved while maps in the racing game are enriched.

In one implementation, the apparatus further includes:

(1) a third receiving unit, configured to receive a third instruction of the first account before a round of racing game starts, the third instruction being used for configuring an ability on the target virtual map for the first account.

According to the method in this embodiment, flexibility in selecting abilities is improved while maps in the racing game are enriched.

In one implementation, the apparatus further includes:

(2) a third activation unit, configured to activate, in a case of obtaining a fourth instruction of the first account, a fourth ability of the first account in a process of a round of racing game, the fourth ability being an ability configured for the first account and a second account, and the second account and the first account being in a same camp.

According to the method in this embodiment, flexibility of ability configurations is improved while maps in the racing game are enriched.

In one implementation, the apparatus further includes:

(1) a reporting unit, configured to report, after obtaining a travel position of the first virtual racing car in the first virtual map, the travel position to a server in a process that a client runs a round of racing game.

According to this embodiment, by reporting positions of virtual racing cars to a server, positions of virtual racing cars of different accounts may be synchronized and displayed, thereby ensuring data synchronization while enriching map richness of the racing game.

Figure 18:
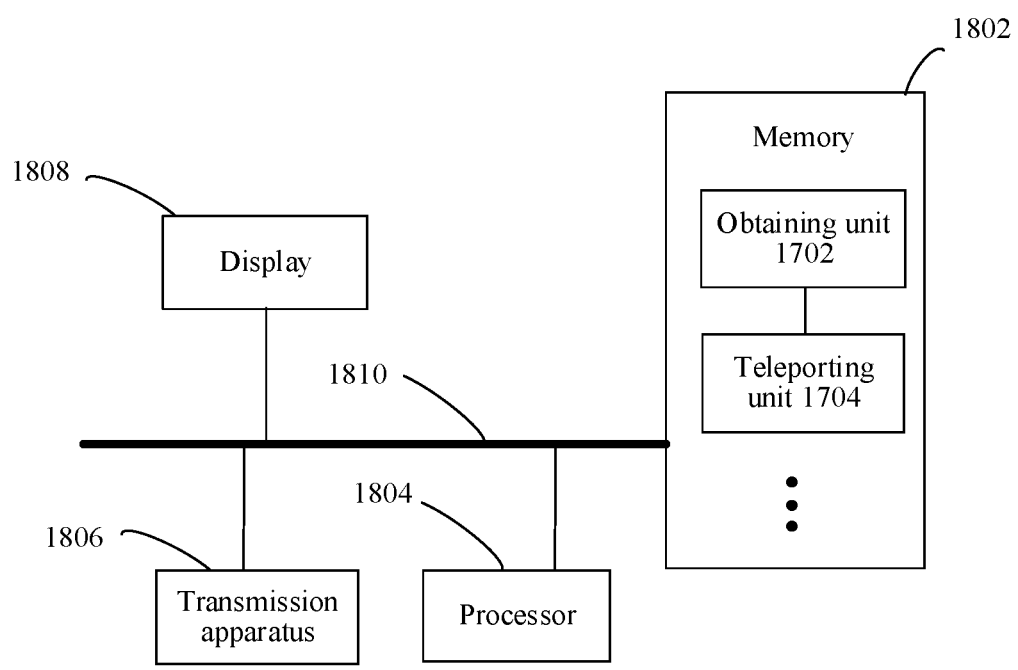
FIG. 18 is a schematic structural diagram of a device according to an embodiment of this application.

According to still another aspect of the embodiments of this application, a device for implementing the above map switching method is further provided. As shown in FIG. 18, the device includes a memory 1802 and a processor 1804. The memory 1802 stores a computer program, and the processor 1804 is configured to perform the steps in any one of the above method embodiments through the computer program.

In one implementation, in this embodiment, the device may be located in at least one of a plurality of network devices in a computer network.

In one implementation, in this embodiment, the processor may be configured to perform the following steps by using the computer program:

S1, obtaining a travel position of a first virtual racing car in a first virtual map in a process that a client runs a round of racing game, the first virtual racing car being controlled by a first account logged into the client, and the first virtual map being a virtual map in the round of racing game; and S2, teleporting the first virtual racing car from the first virtual map to a second virtual map in the round of racing game when the travel position reaches a first teleporter in the first virtual map, the first virtual map being connected to the second virtual map through the first teleporter, a virtual map used in the round of racing game being spliced by a plurality of virtual maps, and the plurality of virtual maps including the first virtual map and the second virtual map.

In one implementation, A person of ordinary skill in the art may understand that the structure shown in FIG. 18 is merely an example, and the device may be a terminal device such as a smartphone (for example, an Android mobile phone and an iOS mobile phone), a tablet computer, a palmtop computer, a mobile Internet device (MID), and a PAD. FIG. 18 does not limit the structure of the device. For example, the device may further include more or fewer components (such as a network interface) than those shown in FIG. 18, or have a configuration different from that shown in FIG. 18.

The memory 1802 may be configured to store a software program and a module, for example, a program instruction/module corresponding to the map switching method and apparatus in a game application in the embodiments of this application, and the processor 1804 performs various functional applications and data processing by running the software program and the module stored in the memory 1802, that is, implementing the foregoing map switching method. The memory 1802 may include a high-speed random access memory, and may also include a non-volatile memory, for example, one or more magnetic storage apparatuses, a flash memory, or another non-volatile solid-state memory. In some embodiments, the memory 1802 may further include memories remotely disposed relative to the processor 1804, and the remote memories may be connected to a terminal by using a network. Examples of the network include, but are not limited to, the Internet, an intranet, a local area network, a mobile communication network, and a combination thereof. The memory 1802 may specifically store, but not limited to, information generated in a racing game. In an example, as shown in FIG. 18, the memory 1802 may include, but is not limited to, the obtaining unit 1702 and the teleporting unit 1704 in the foregoing map switching apparatus. In addition, the memory may further include, but is not limited to, other module units in the map switching apparatus in the game application, and details are not described in this example again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In one implementation, the foregoing transmission apparatus 1806 is configured to receive or transmit data by using a network. Specific examples of the foregoing network may include a wired network and a wireless network. In an example, the transmission apparatus 1806 includes a network interface controller (NIC). The NIC may be connected to another network device and a router by using a network cable, so as to communicate with the Internet or a local area network. In an example, the transmission apparatus 1806 is a radio frequency (RF) module, which communicates with the Internet in a wireless manner.

In addition, the device further includes: a display 1808, configured to display a scene in a racing game; and a connection bus 1810, configured to connect various module components in the device.

According to still another aspect of the embodiments of this application, a storage medium is further provided. The storage medium stores a computer program, the computer program being set to perform steps in any one of the foregoing method embodiments when run.

In one implementation, in this embodiment, the storage medium may be set to store a computer program for performing the following steps:

S1, obtaining a travel position of a first virtual racing car in a first virtual map in a process that a client runs a round of racing game, the first virtual racing car being controlled by a first account logged into the client, and the first virtual map being a virtual map in the round of racing game; and S2, teleporting the first virtual racing car from the first virtual map to a second virtual map in the round of racing game when the travel position reaches a first teleporter in the first virtual map, the first virtual map being connected to the second virtual map through the first teleporter, a virtual map used in the round of racing game being spliced by a plurality of virtual maps, and the plurality of virtual maps including the first virtual map and the second virtual map.

In one implementation, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

According to still another aspect of the embodiments of this application, a computer program product including instructions is provided, the instructions, when run on a computer, causing the computer to perform the steps according to any one of the foregoing method embodiments.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A map switching method performed at a computer device, the method comprising:
    launching a process corresponding to a round of racing game for a client at the computer device, the round of racing game having a plurality of virtual maps that are spliced together and including a first virtual map and a second virtual map that is connected to the first virtual map through a first teleporter;
    obtaining a travel position of a first virtual racing car in a first virtual map, the first virtual racing car being controlled by a first account logged into the client;
    teleporting the first virtual racing car from the first virtual map to the second virtual map in the round of racing game when the travel position reaches the first teleporter in the first virtual map;
    switching a virtual racing car controlled by the first account in the second virtual map from the first virtual racing car to a second virtual racing car when the second virtual map is a target virtual map; and
    controlling the second virtual racing car to travel in the second virtual map, the target virtual map and the second virtual racing car being selected by the first account before the round of racing game starts.

2. The method according to claim 1, further comprising:
    activating a first ability configured for the second virtual racing car on the client, the first ability being an ability selected by the first account before the round of racing game starts and automatically activated or activated by an activation instruction on the target virtual map.

3. The method according to claim 1, further comprising:
    controlling the first virtual racing car to travel in the second virtual map; and
    activating a second ability configured for the first virtual racing car on the client when the second virtual map is the target virtual map, the second ability being an ability selected by the first account before the round of racing game starts and automatically activated or activated by an activation instruction on the target virtual map.

4. The method according to claim 1, further comprising:
    using the first virtual racing car as a virtual racing car controlled by the first account in the second virtual map when the second virtual map is different from the target virtual map.

5. The method according to claim 4, further comprising:
    receiving an activation instruction used for activating a third ability; and
    activating the third ability on the client, the third ability being an ability configured for the first virtual racing car on the second virtual map, and the third ability comprising an ability configured for the first virtual racing car on the first virtual map.

6. The method according to claim 1, further comprising:
    selecting the plurality of virtual maps comprising the first virtual map and the second virtual map from a virtual map set before the round of racing game starts; and
    splicing the plurality of virtual maps together to be used in the round of racing game.

7. The method according to claim 1, further comprising:
    receiving a first instruction of the first account before the round of racing game starts, the first instruction being used for selecting one virtual map from the plurality of virtual maps as the target virtual map of the first account.

8. The method according to claim 1, further comprising:
    receiving a second instruction of the first account before the round of racing game starts, the second instruction being used for selecting a virtual racing car used on the target virtual map from a plurality of virtual racing cars for the first account.

9. The method according to claim 1, further comprising:
    reporting the travel position to a server, wherein the server forwards the travel position to a second account of the round of racing game, the second account being logged into another client at another computer device for controlling another virtual car in the round of racing game.

10. A computer device, comprising a memory and a processor, the memory storing a plurality of computer programs that, when executed by the processor, cause the computer device to perform a plurality of operations including:
    launching a process corresponding to a round of racing game for a client at the computer device, the round of racing game having a plurality of virtual maps that are spliced together and including a first virtual map and a second virtual map that is connected to the first virtual map through a first teleporter;
    obtaining a travel position of a first virtual racing car in a first virtual map, the first virtual racing car being controlled by a first account logged into the client;
    teleporting the first virtual racing car from the first virtual map to the second virtual map in the round of racing game when the travel position reaches the first teleporter in the first virtual map;
    switching a virtual racing car controlled by the first account in the second virtual map from the first virtual racing car to a second virtual racing car when the second virtual map is a target virtual map; and
    controlling the second virtual racing car to travel in the second virtual map, the target virtual map and the second virtual racing car being selected by the first account before the round of racing game starts.

11. The computer device according to claim 10, wherein the plurality of operations further comprise:
  activating a first ability configured for the second virtual racing car on the client, the first ability being an ability selected by the first account before the round of racing game starts and automatically activated or activated by an activation instruction on the target virtual map.

12. The computer device according to claim 10, wherein the plurality of operations further comprise:
  controlling the first virtual racing car to travel in the second virtual map; and
  activating a second ability configured for the first virtual racing car on the client when the second virtual map is the target virtual map, the second ability being an ability selected by the first account before the round of racing game starts and automatically activated or activated by an activation instruction on the target virtual map.

13. The computer device according to claim 10, wherein the plurality of operations further comprise:
  using the first virtual racing car as a virtual racing car controlled by the first account in the second virtual map when the second virtual map is different from the target virtual map.

14. The computer device according to claim 13, wherein the plurality of operations further comprise:
  receiving an activation instruction used for activating a third ability; and
  activating the third ability on the client, the third ability being an ability configured for the first virtual racing car on the second virtual map, and the third ability comprising an ability configured for the first virtual racing car on the first virtual map.

15. The computer device according to claim 10, wherein the plurality of operations further comprise:
  selecting the plurality of virtual maps comprising the first virtual map and the second virtual map from a virtual map set before the round of racing game starts; and
  splicing the plurality of virtual maps together to be used in the round of racing game.

16. The computer device according to claim 10, wherein the plurality of operations further comprise:
  receiving a first instruction of the first account before the round of racing game starts, the first instruction being used for selecting one virtual map from the plurality of virtual maps as the target virtual map of the first account.

17. The computer device according to claim 10, wherein the plurality of operations further comprise:
  receiving a second instruction of the first account before the round of racing game starts, the second instruction being used for selecting a virtual racing car used on the target virtual map from a plurality of virtual racing cars for the first account.

18. The computer device according to claim 10, wherein the plurality of operations further comprise:
  reporting the travel position to a server, wherein the server forwards the travel position to a second account of the round of racing game, the second account being logged into another client at another computer device for controlling another virtual car in the round of racing game.

19. A non-transitory computer-readable storage medium, storing a plurality of computer programs that, when executed by a processor of a computer device, cause the computer device to perform a plurality of operations including:
  launching a process corresponding to a round of racing game for a client at the computer device, the round of racing game having a plurality of virtual maps that are spliced together and including a first virtual map and a second virtual map that is connected to the first virtual map through a first teleporter;
  obtaining a travel position of a first virtual racing car in a first virtual map, the first virtual racing car being controlled by a first account logged into the client;
  teleporting the first virtual racing car from the first virtual map to the second virtual map in the round of racing game when the travel position reaches the first teleporter in the first virtual map;
  switching a virtual racing car controlled by the first account in the second virtual map from the first virtual racing car to a second virtual racing car when the second virtual map is a target virtual map; and
  controlling the second virtual racing car to travel in the second virtual map, the target virtual map and the second virtual racing car being selected by the first account before the round of racing game starts.

20. The non-transitory computer-readable storage medium according to claim 19, wherein the plurality of operations further comprise:
  activating a first ability configured for the second virtual racing car on the client, the first ability being an ability selected by the first account before the round of racing game starts and automatically activated or activated by an activation instruction on the target virtual map.

* * * * *